US008095226B2

(12) United States Patent
Mestha et al.

(10) Patent No.: US 8,095,226 B2
(45) Date of Patent: Jan. 10, 2012

(54) METHODS AND SYSTEMS TO SCHEDULE GAINS IN PROCESS CONTROL LOOPS

(75) Inventors: Lalit Keshav Mestha, Fairport, NY (US); Prudhvi K. Gurram, Rochester, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 384 days.

(21) Appl. No.: 12/363,898

(22) Filed: Feb. 2, 2009

(65) Prior Publication Data

US 2010/0198368 A1 Aug. 5, 2010

(51) Int. Cl.
*G05B 13/04* (2006.01)

(52) U.S. Cl. .............. 700/28; 700/52; 358/1.1; 358/2.1; 358/518

(58) Field of Classification Search ..................... 700/28
See application file for complete search history.

(56) References Cited

U.S. PATENT DOCUMENTS

| | | | | |
|---|---|---|---|---|
| 5,243,383 | A * | 9/1993 | Parisi | 399/50 |
| 5,749,021 | A | 5/1998 | Mestha et al. | |
| 5,754,918 | A | 5/1998 | Mestha et al. | |
| 7,127,187 | B2 * | 10/2006 | Mo et al. | 399/49 |
| 7,768,672 | B2 * | 8/2010 | Gil et al. | 358/1.9 |
| 2008/0043271 | A1 | 2/2008 | Gil et al. | |
| 2010/0177366 | A1 * | 7/2010 | Mestha et al. | 358/518 |

OTHER PUBLICATIONS

Qin et al., "A survey of industrial model predictive control technology," *Control Engineering Practice*, 2003, vol. 11, pp. 733-764.
Mestha et al., U.S. Appl. No. 12/352,350, filed Feb. 1, 2008.

* cited by examiner

*Primary Examiner* — Kakali Chaki
*Assistant Examiner* — Walter Hanchak
(74) *Attorney, Agent, or Firm* — Oliff & Berridge, PLC

(57) ABSTRACT

Methods and planning systems used to schedule gain matrices for process control loops and determine optimal values for manipulated variables according to a minimum cost function. A cost function is calculated for each of a predetermined number of plans as a sum of partial cost functions calculated over a predetermined number of projections in a horizon. Each partial cost function after the initial projection of a plan is calculated using a scheduled gain matrix. The gain matrix can be scheduled for each projection by selection from a predetermined set of gain matrices or can be calculated in real time during the calculation for each projection.

9 Claims, 13 Drawing Sheets

METHODS AND SYSTEMS TO SCHEDULE GAINS IN PROCESS CONTROL LOOPS

BACKGROUND

Process control involves maintaining processes, such as industrial, commercial, or other processes operating on systems within desired operating limits. Such processes have variables that can be controlled, or set, to control and manipulate the process, other variables that can be measured to monitor the status of the process, and still other variables that cannot be controlled or that, for any of various reasons, are not controlled even though they could be. The problem of process control is to maintain a process within acceptable limits by controlling input variables of the process, using measurements of other variables as feedback to determine the status of the process.

Generally, a level 1 process control is the dynamic control of multiple process variables; a setpoint is a reference or target value to which a process controller (e.g., a level 1 process controller) attempts to maintain its process; and level 2 process control is the optimization of the level 1 process control setpoints. In some existing systems, a single gain matrix solution was adopted for the level 1 and level 2 controls in order to keep a multiple-input multiple-output (MIMO) process to known setpoints. Setpoints change with changes to the process. Setpoints also change with drift in the print engine. For example, in electrostatic printing systems, level 1 setpoints such as $V_{high}$ and $V_{low}$ targets, change when the level 2 control system determines new level 1 setpoints to adjust for drift in developability. Also, some systems do not have a level 1 control loop. In such systems also, for the same setpoint target, the dynamic range of actuators, mechanisms that operate as part of a process, can change depending on the drift. $V_{high}$ is the voltage to which the photoreceptor is charged before the exposure process is begun and $V_{low}$ is the voltage to which the photoreceptor charged area is discharged after being exposed to the laser beam. Actuators at each level of control action are the manipulated input variables used to control the process so that after all control actions are executed the process will be at a desired state. All the possible values (range of values) that an actuator can take to maintain a process in a desired state or to transform the process from one state to another state constitute the dynamic range of the actuator. For example, the charge on the photoconductor surface is maintained (or controlled) to a desired state by adjusting the voltage $V_{high}$. At the charging station, a corona generating device or other charging device generates a charge voltage to charge the photoconductive belt or drum to a relatively high, substantially uniform voltage potential. The corona generator comprises a corona generating electrode, a shield partially enclosing the electrode, and a grid disposed between the belt or drum and the unenclosed portion of the electrode. The electrode charges the photoconductive surface of the belt/drum via corona discharge. The voltage potential applied to the photoconductive surface of the belt or drum can be varied by controlling the voltage potential of the wire grid. Thus, the wire grid voltage, $V_{grid}$, is an actuator. The actual voltage on the photoconductive surface, $V_{high}$, becomes the outcome of the control action initiated by the change in actuator values. Thus, when the system settles after a control action, the outcome of the control action will result with $V_{high}$ reaching the desired state.

Electrostatic printing processes are one example of controlled processes. To achieve predictable print quality consistently time after time in electrostatic printing processes, important internal parameters, states of the system, are controlled by applying feedback to process actuators based on toner state measurements on the photoreceptor/intermediate belt or the drum. These loops maintain background, solid area development, and tone reproduction curves of individual primary colors by adjusting various internal process and image actuators operating at varying frequency while making prints. Because the dynamic range of actuators is limited to remain within practical limits, limits are set for charge voltage, exposure ROS intensity and the development bias voltage due to cost and other considerations. In existing systems, a multiple-input multiple-output (MIMO) single gain matrix solution is designed using state feedback (SF) methods. State feedback is a feedback control method that provides the ability to affect every state, which may be measured or estimated, through control actuation. The control actions (i.e., change in control input variables) are generated by summing the gain-weighted states through a gain matrix for a MIMO system and through a gain vector for a SISO (single-input single-output) system. This solution is used in some existing Xerographic systems. See L. K. Mestha, "Control Advances in Production Printing and Publishing Systems", Published in the proceedings of IS&T's "The 20th International Congress on Digital Printing Technologies (NIP20)", Oct. 31-Nov. 5, 2004, Salt Lake City, Utah; U.S. Pat. Nos. 5,749,021; and 5,754,918. As a result of this approach, the dynamic range of actuators required for control actions can become too large. That is, the control of the actuators can result in wide excursions sufficient to lead to many undesirable stability problems, particularly when systems, such as print engines, are operating at their limits. For example, in a level 1 process control loop, the actuators that are normally used for controlling the photoreceptor surface potential to within a precise range of $V_{high}$ (the charge on the photoreceptor surface) and $V_{low}$ (the charge on the photoreceptor after it is discharged with a laser) are the grid voltage, $V_{grid}$, and the exposure intensity, X, of the laser. The photoconductive surface is exposed at the exposure station when the modulated light (laser) beam impinges on the surface of photoreceptor, selectively illuminating the charged surface of photoreceptor to form an electrostatic latent image. The fully exposed portion of the photoreceptor depends on both the amount of exposure intensity of the laser and the grid voltage. The photoreceptor surface voltage, $V_{high}$, depends on the grid voltage. Thus, this type of system is called a two-input two-output control system with actuators $V_{grid}$ and X varying within the dynamic range of lower to upper bounds (or limits). Higher X can result in saturation of exposed photoreceptor, resulting in no change for $V_{low}$. Similarly, always using higher $V_{grid}$ can reduce corotron life. Always operating at lower limit of $V_{grid}$ may not give sufficient developability. Hence, a robust MIMO control system should always use actuator values within their limits (near their "sweet spots") and not have the need to be operated at their upper/lower limits. If actuators are operating at their limits, then the single gain matrix used in the control loop is requesting higher actuations than what would have been possible had the control system used multiple gain matrices. A second example is related to the fuel efficiency of a typical automobile. If the automobile always operates at its top speed (say >130 miles per hour assuming we are permitted to drive at that speed), the fuel efficiency can be very low because the "sweet spot" for best fuel efficiency is around 55-60 miles per hour. That is, for a nonlinear process control system, a single gain matrix solution is not optimal. Use of a single gain matrix can lead to large excursions of actuators and, in many instances, actuators operating at their limits. Thus, there is a need for methods and control systems that reduce large excursions.

SUMMARY

Disclosed herein are systems and methods to schedule gains in a process control loop for a process performed by a system, that include the elements or steps of reading values for controlled variables of the process from one or more sensors of the system; and determining values to be applied to the process for each of manipulated variables of the process, each value for the manipulated variables being determined by using at least two different gain matrices, wherein the values for the manipulated variables are determined for the process at discrete time intervals.

According to some implementations, the process is an electrostatic printing process, and the controlled variables are developed masses per area (DMAs) of content portions on a recording medium. Content portions are any image or portion of an image sensed to provided feedback, and can be test portions (for example, approximately 1 square inch patches in inter-document zones) or images specifically formed to provide feedback. Alternatively, portions of images formed in normal operation by a user could be used. The controlled variables for such implementations can be the developed mass per area (DMA) for each of low, medium, and high tone content portions on a recording medium and, for such implementations, the values for the manipulated variables can include the photoreceptor grid voltage, the ROS laser intensity, and/or the development bias voltage.

In some embodiments, the systems and methods to schedule gains in a process control loop for a process performed by a system include elements or steps of (i) determining a number of plans for the process control loop, and (ii) determining values for the manipulated variables including: (a) iteratively computing a cost function for each plan in the process control loop; (b) determining a minimum cost function of the plans; and (c) determining values for the manipulated variables according to the minimum cost function.

In some embodiments, the systems and methods to schedule gains in a process control loop for a process performed by a system include elements or steps of (i) determining a number of projections in a projection horizon for the process control loop, and (ii) iteratively computing a cost function for each plan including; (a) determining at least two gain matrices, (b) iteratively computing a partial cost function using the gain matrix for each projection in the projection horizon for the corresponding plan; and (c) summing the partial cost functions of the projections to produce a cost function for the corresponding plan. Preferably, the gain matrix for each plan is chosen from a set of predetermined gain matrices. In some embodiments, the set of predetermined gain matrices are generated for all combinations of Jacobian matrices for the system and all pole locations for the system. A Jacobian matrix consists of partial derivatives of each of the outputs with respect to each of the inputs in a MIMO system as its elements. It defines a local linear model of a non-linear MIMO system at a nominal input. Linear systems can be represented by transfer functions. A transfer function is the ratio of a system's frequency-domain output to the frequency-domain input. Alternatively, the transfer function is the ratio of a numerator polynomial equation and a denominator polynomial equation. For an open loop system represented by a transfer function, pole locations are the roots of the denominator equation. For a closed loop system, the pole locations (pole values) are the roots of the characteristic equation, or the roots of the denominator equation when the closed loop system is represented in the form of numerator and denominator polynomial equations. Pole locations for an open-loop or closed-loop system represent the transient performance (such as overshoot, rise time, settling time, and frequency of oscillations) of a control system. For example, when pole locations are simple there are no oscillations in the output for a step change in input. If the pole locations are complex then oscillations which could be damped, underdamped, or growing in amplitude can result from a step change in input.

In some embodiments, the systems and methods to schedule gains in a process control loop for a process performed by a system include elements or steps of (i) determining a number of projections in a projection horizon for the process control loop, and (ii) iteratively computing a cost function for each plan comprising: (a) iteratively computing a partial cost function for each projection in the projection horizon for the corresponding plan; and (b) determining a gain matrix of at least two gain matrices, the partial cost function for each projection in the corresponding plan beyond the initial projection being based on a corresponding gain matrix. The process of iteratively computing a partial cost function for each projection includes summing the partial cost functions of the projections to produce a cost function for the corresponding plan, wherein each gain matrix is calculated from a Jacobian matrix and one set of pole locations for the system.

EMBODIMENTS

Figure 1A:
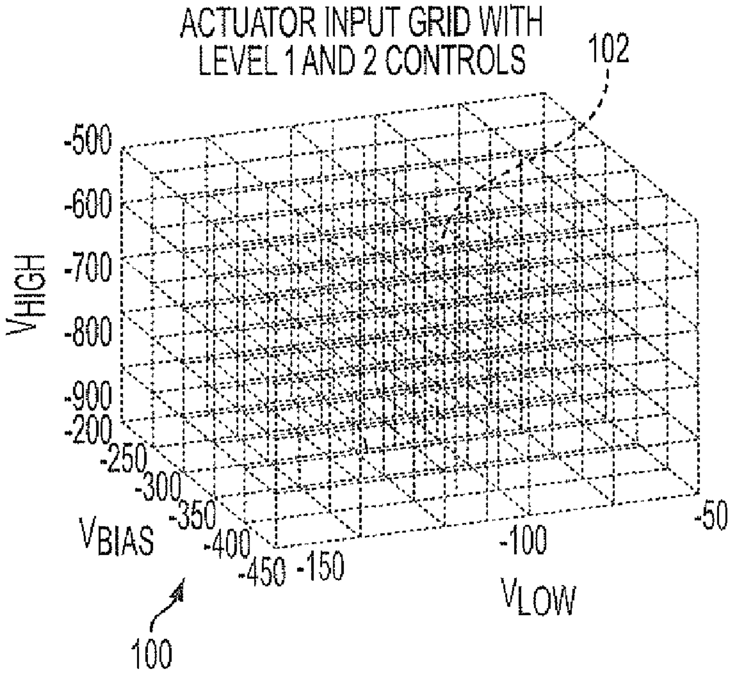
FIGS. 1(*a*)-1(*c*) are input-output look up tables for a level 2 control system.

The disclosure is directed towards process control for industrial, commercial, and other processes operating on a system, such as chemical manufacturing processes, other manufacturing processes, printing processes, etc., and is especially suited for controlling non-linear processes. Although the general process is applicable beyond printing, the actuators and sensors disclosed herein are specific to printers such as digital xerographic printers. In general, the approach is applicable for gain scheduling in variety of control systems, such as for aircrafts, automobiles, semiconductor manufacturing processing, etc. More specifically, the disclosure is directed to closed-loop control of processes by determining manipulated variables based on feedback from controlled variables, the manipulated variables of the process being set at predetermined time intervals, denoted herein as k, k+1, etc. Still more specifically, while the disclosure is not limited to electrostatic printing processes, specific implementations are disclosed relating to electrostatic printing processes.

Systems and methods for scheduling multiple gain matrices for a process control system using a multiple-input multiple-output (MIMO) Model-Predictive Control (MPC) method are disclosed to select a multiplicity of gain matrices automatically during the control process. A performance function is created and includes (i) minimizing the error values between the target and measurements, (ii) minimizing the control energy of actuators, and/or (iii) setting the trade-offs between (i) and (ii) while at the same time fine tuning the convergence performance of the controller, such as by minimizing the time till the controller's output converges to be within a tolerance threshold. Further, during the closed loop control process, the algorithm selects appropriate gain matrices based on the targets (e.g., DMA targets in a printing system such as the Xerox iGen3, Xerox iGen4, and Xerox DC7000/DC8000 product types), based on minimization criteria from the multiplicity of gain matrices already stored in the database or calculated from the input-output characterization data. The gain matrices are chosen based on a systematic MIMO model-predictive control methodology.

As described hereafter, the algorithm has been simulated using a virtual printer model containing xerographic subsystem models. The level 1 and level 2 process control loops were implemented in the simulated xerographic process. The results showing the improvements for level 2 actuators for a set of DMA targets for the described gain scheduling algorithms are presented in relation to the results of the level 2 actuators without the use of the described gain sharing algorithms.

As used herein, "manipulated variable" is defined as a variable or control input of a process in a system that is controlled or set to control or manipulate the process. "Controlled variable" is defined as an output variable of the process on the system. The controlled variable is monitored, such as by a sensor, to provide input or feedback of the status of the process. "Disturbance variable" is defined as a variable that influences a process, but is not used as control variable. The disturbance variable affects the output. "Unit" as used herein is defined as a hardware component, device, or apparatus configured to perform the described functionality. Each unit disclosed or claimed may be configured, for example, by software such as a program that configures a processing device, unit, or circuit to perform the disclosed or claimed functionality. Alternatively, a unit can be purely hardware-implemented circuitry (for example, an application specific integrated circuit (ASIC)) or any combination of hardwired circuitry and software or program configured circuitry.

As used herein, level 1 process control is defined as the dynamic control of multiple process variables; setpoint is defined as a reference or target value to which a process controller (e.g., level 1 process controller) attempts to maintain its process; and level 2 process control is defined as the optimization of the level 1 process control setpoints. As used herein, a hard setpoint or hard target is a setpoint or target that cannot be violated, and a soft setpoint or soft target is a setpoint or target that, when necessary, can be violated if the setpoint or target must be violated so that other setpoints and targets that have a higher priority can be met. For example, in the Xerox Production Color printing system (e.g., the Xerox iGen3 printer), a level 2 controller provides setpoints or targets for one or more level 1 controllers.

Further background in process control can be found in Passino, *Biomimicry for Optimization, Control, and Automation*, London: Springer-Verlag, 2004, incorporated herein by reference in its entirety; U.S. Patent Application Publication No. 2008/0043271, incorporated herein by reference in its entirety; Mestha, et al., "Sensitivity matrix determination for adaptive color control", U.S. patent application Ser. No. 12/024,221, filed Feb. 1, 2008, incorporated herein by reference in its entirety; and Mestha et al., "Algorithms and methods to match color gamuts for multi-machine matching", U.S. patent application Ser. No. 12/352,350, filed Jan. 12, 2009, incorporated herein by reference in its entirety.

Figure 1B:
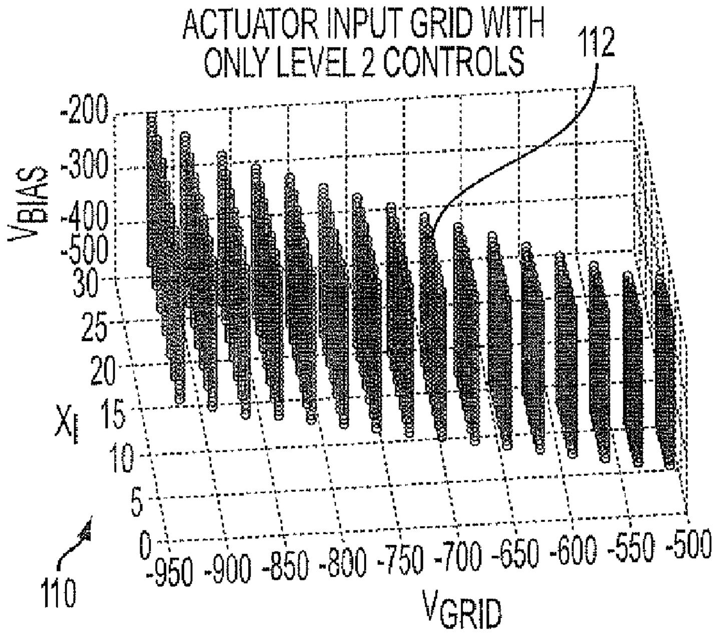
Figure 1C:
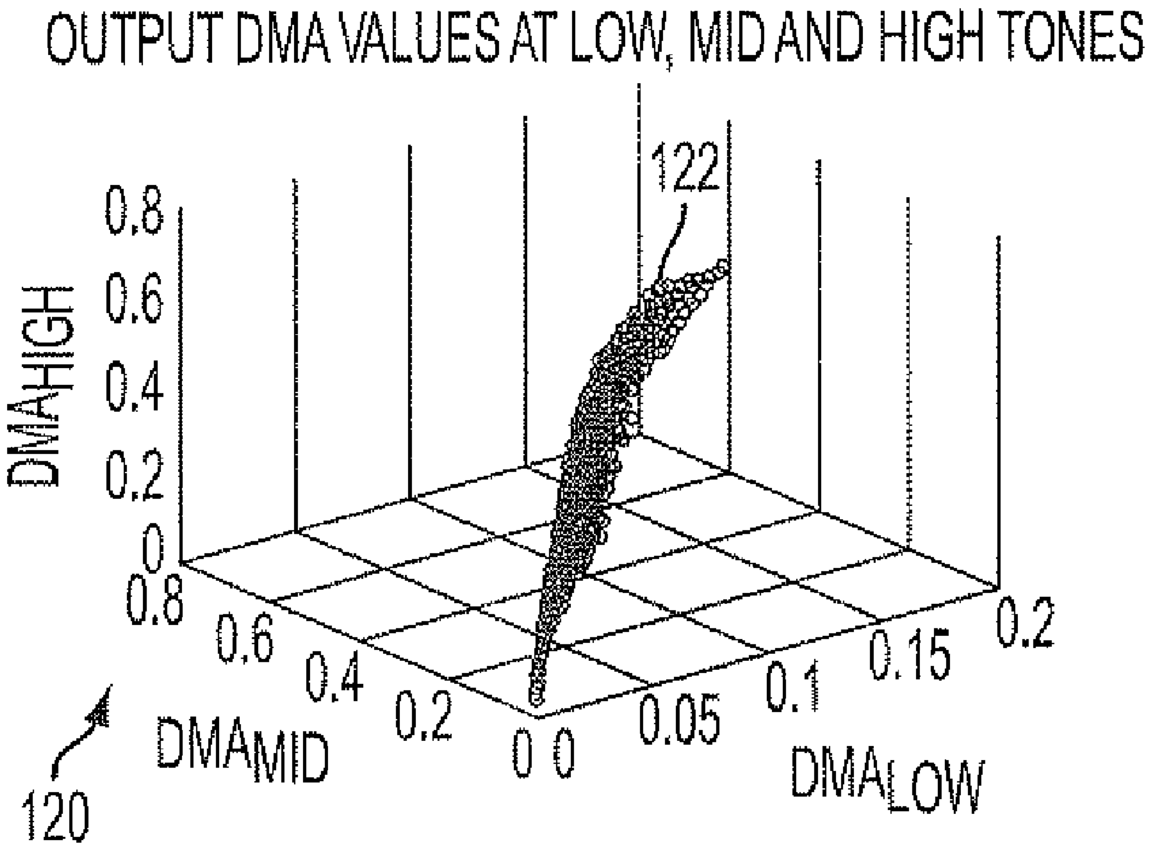

FIGS. 1(*a*), (*b*) and (*c*) show input and output lookup tables (LUTs) for a nonlinear process in the application of a xerographic system. FIG. 1(*a*) shows a three-dimensional graph 100 of the feasible and controllable input actuator grid 102 that includes the photoreceptor charge target ($V_{high}$), the exposed photoreceptor charge target ($V_{low}$) and the development bias voltage target ($V_{bias}$) in a level 2 control system having hard and soft targets for the actuators. In this case, $V_{high}$ and $V_{low}$ are soft targets used as actuators for level 1 controls and $V_{bias}$ is a hard actuator. FIG. 1(*b*) shows a three-dimensional graph 110 of the feasible input actuator values 112 of the photoreceptor grid voltage ($V_{grid}$), ROS laser intensity ($X_l$), and development bias voltage ($V_{bias}$), when used for a process control system with hard actuators and system constraints. These actuator values are determined from the grid points 102 of FIG. 1(*a*). FIG. 1(*c*) is a three-dimensional graph 120 showing the output developed mass per unit area (DMA) values 122 for content on a photoreceptor at low (highlight), mid (mid), and high (shadow) tones corresponding to the input actuator values 102 and 112 shown in FIG. 1(*a*) and FIG. 1(*b*). For a multi-input multi-output system of the kind used in level 2 process controls there are three inputs and three outputs. A single gain matrix will have 3×3=9 elements with many elements containing non-zero values. For a nonlinear process control system, a single gain matrix solution is not optimal because the single gain matrix solution represents a linear controller operating on a nonlinear process control system. It is well known in the control discipline that a nonlinear controller is more suited to work well for a nonlinear system when compared to a linear controller. A multiple gain matrix solution offers the equivalent of a nonlinear controller. Nonlinear systems are difficult to analyze and solve because they exist in a broad variety of forms that prevent using linear control theory for analysis. Use of a single gain matrix can lead to large actuator excursions, although large excursions can be minimized if the gains are scheduled carefully taking into account a priori the process nonlinearity through input-output characterization.

Described herein is a systematic methodology to select a multiplicity of gain matrices during operation of the process control method. This methodology does not call for hardware changes to most existing systems. It can be implemented in current hardware with additional configuration by appropriate control programming.

In a specific application, an algorithm is disclosed to schedule multiple gain matrices based on the DMA setpoints given by a level 2 controller. The gain matrices are scheduled by using Model Predictive Control (MPC) techniques. The algorithm is based on minimization of the Euclidean norm of the difference between the target DMA setpoint and the measured DMA value from the system.

MIMO MPC: Theoretical Framework

Let k denote the time index, called the iteration number or iteration step. Let x(k) denote the state of the control inputs, $x(k) \in \mathfrak{R}^3$. Control inputs generally have valid ranges in which they can be set and invalid ranges for which they cannot be set. The boundary that defines the valid ranges of all the controlled actuators over all the controlled variables of a process can be determined. The bounded space is called the feasible region.

Let u(k) be defined as the control inputs, the manipulated variables, of a process. For example, for electrostatic printing processes, u(k) could be the photoreceptor grid voltage ($V_g$), the ROS laser intensity ($X_l$), and the development bias voltage ($V_b$). Thus, u(k) for this application would be $[V_g, X_l, V_b]$. Let y(k) be the controlled variables, the measured process outputs, such as, in the application to electrostatic printing processes, DMA measurements of low, mid, and high tones at time iteration step k+1 obtained by a sensor, and is defined as:

$$y(k+1)=f(x(k),u(k),d(k))=\lfloor D_{k+1}{}^{l} D_{k+1}{}^{m} D_{k+1}{}^{h} \rfloor \in \mathfrak{R}^3 \tag{1}$$

where f is a smooth function of the states of x(k), $x(k) \in \mathfrak{R}^3$ (i.e., any actuator value combination in the feasible region), and d(k) is a white-noise signal. Let r(k) denote the reference values for the manipulated variables or manipulated actuators, $r(k) \in \mathfrak{R}^3$. At time iteration k, r(k) is defined as:

$$r(k)=[D_{r,k+j}{}^{l} D_{r,k+j}{}^{m} D_{r,k+1}{}^{h}] \tag{2}$$

The tracking error is defined as:

$$e(k+j)=[D_{r,k+j}{}^{l} D_{r,k+j}{}^{m} D_{r,k+1}{}^{h}]-y(k+j) \tag{3}$$

Further, $[D_{r,k+j}{}^{l} D_{r,k+j}{}^{m} D_{r,k+1}{}^{h}]=[D_r{}^{l} D_r{}^{m} D_r{}^{h}]$ for a given level 2 setpoint for all k,j.

The goal is to provide a planning strategy that generates a sequence of control inputs which minimizes the tracking error e(k) for all k. The sequence of control inputs of the $i^{th}$ plan of length N is denoted as:

$$u^i[k,N]=u^i(k,0), u^i(k,1), u^i(k,2), \ldots u^i(k,N-1) \tag{4}$$

Each plan i is formed by a set of control inputs generated by a state-feedback controller for a specific pair conformed by the printer Jacobian and the pole locations. A list is defined beforehand that contains the number of Jacobians and pole locations using input-output characterization that are to be used for the MPC. The controller considers a pair that is a combination between one Jacobian and one pole location obtained from the list. The level 2 Jacobian can be computed in realtime using a stored level 2 model. In this case, Pole locations are assigned during iteration.

The discrete model is defined as:

$$y_m(j+1)=f_m(x_m(j), u(j)) \text{ for } j=0,1, \ldots, N-1 \tag{5}$$

where j is the estimation iteration index for plan i. Using the control input $u^i[k, N]$, the $j^{th}$ estimated output value generated at time k is defined as $y_m{}^i(k,j)$. To see how the control input $u^i[k, N]$ of plan i affects the system, the behavior of the system output is projected at time k over the projection horizon, that is, for j=0,1, . . . , N−1:

$$y_m{}^i(k,j+1)=f_m(x_m{}^i(k,j),u^i(k,j)) \tag{6}$$

and the system states are given by:

$$x_m{}^i(k,j+1)=I^*x_m{}^i(k,j)+K^l(k)e^i(k,j) \tag{7}$$

where $x_m{}^i(k,j)$ is the $j^{th}$ estimated state value of plan i at time k; $I \in \mathfrak{R}^3$ is the identify matrix; $K^i(k)$ is the $i^{th}$ gain matrix used for the entire projection; and $e^l(k,j)$ is the $j^{th}$ estimated tracking error of plan i at time k. It is to be noted that $x_m{}^i(k,j)$ are the estimated actuator values and $y_m{}^i(k,j)$ are the estimated low DMA ($DMA_{low}$ or $D_l$), mid DMA ($DMA_{mid}$ or $D_m$), and high DMA ($DMA_{high}$ or $D_h$) values from the model, such as from the LUT defined from FIGS. 1(*b*) and 1(*c*).

To evaluate the performance of each plan i, the cost function is defined as:

$$J(u^i[k, N]) = w\sum_{j=0}^{N-1} (E^i(k+j))^2 + w_2\sum_{j=0}^{N-1} \|u^i(k, j)\|^2 \tag{8}$$

where $E^i(j+k)$ is defined as:

$$E^i(k+j)=\|[D_{r,k+j}{}^{l} D_{r,k+j}{}^{m} D_{r,k+j}{}^{h}]-y(k+j)\| \tag{9}$$

$u^i(k,j)$ is defined as:

$$u^i(k,j)=K^i(k)^*([D_{r,k+j}{}^{l} D_{r,k+j}{}^{m} D_{r,k+j}{}^{h}]-y(k+j)) \tag{10}$$

and $\|\alpha\|$ is the 2-norm (euclidean) of vector α, that is, the distance between two vectors. The variables $w_1$ and $w_2$ are positive constants/weighting coefficients that scale the error between the targets and the measurements, and the control energy, respectively, so that (i) more emphasis can be put on the error between the target and measurements, (ii) more emphasis can be put on the control energy of the actuators used to track this error, or (iii) a balance can be achieved between (i) and (ii).

To select the best plan i, we compute $$i^* = \arg\min_i J(u^i[k, N]) \tag{11}$$

for each time k to determine the plan index number i having the minimum cost function. Then, the control input $u(k)=u^i(k,0)$, that is, the first input of the best control input, is selected for application to the system.

Figure 2:
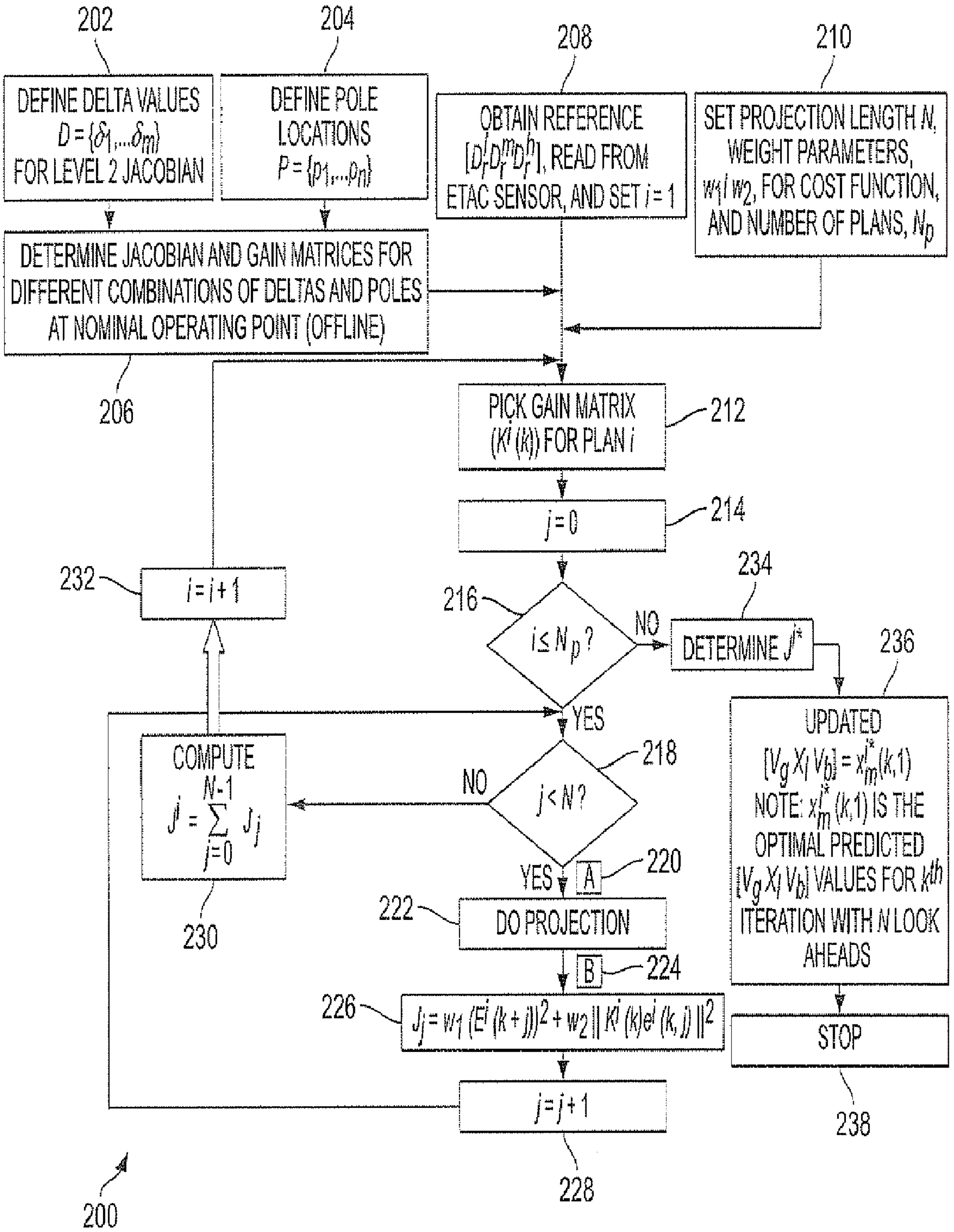
FIG. 2 is a flow diagram for a level 2 model predictive controller system.

FIG. 2 shows one implementation of this method. At step 202, delta values are defined, and, at step 204, the pole locations are defined. Delta values determine the values by which the inputs are varied in order to determine the Jacobian numerically. Usually delta values can be determined based on the sensitivity of the outputs with respect to the inputs. At step 206, the Jacobian matrix is generated for the system. Further at step 206, a set of gain matrices is generated based on a multiplicity of deltas and poles based on the nominal operating point of the system. At step 208, the reference output values y(k) are read from the sensors for the system, and the plan iteration number i is set to 1. At step 210, the projection length N, weight parameters $w_1$ and $w_2$, and number of plans $N_p$ are set.

At step 212, a gain matrix $K^i(k)$ is chosen for plan i. At step 214, the projection iteration index j is set to zero. At step 216, it is determined whether the plan iteration index i is greater than $N_p$ or not. If the plan iteration index i is less than or equal to the number of plans $N_p$, at step 218, it is determined whether the projection index j is less than the number of projections N or not. If the projection index j is less than the number of projections, control passes to the “do projection” procedure 222, delimited by “A” 220 and “B” 224, shown in greater detail in FIG. 3.

Figure 3:
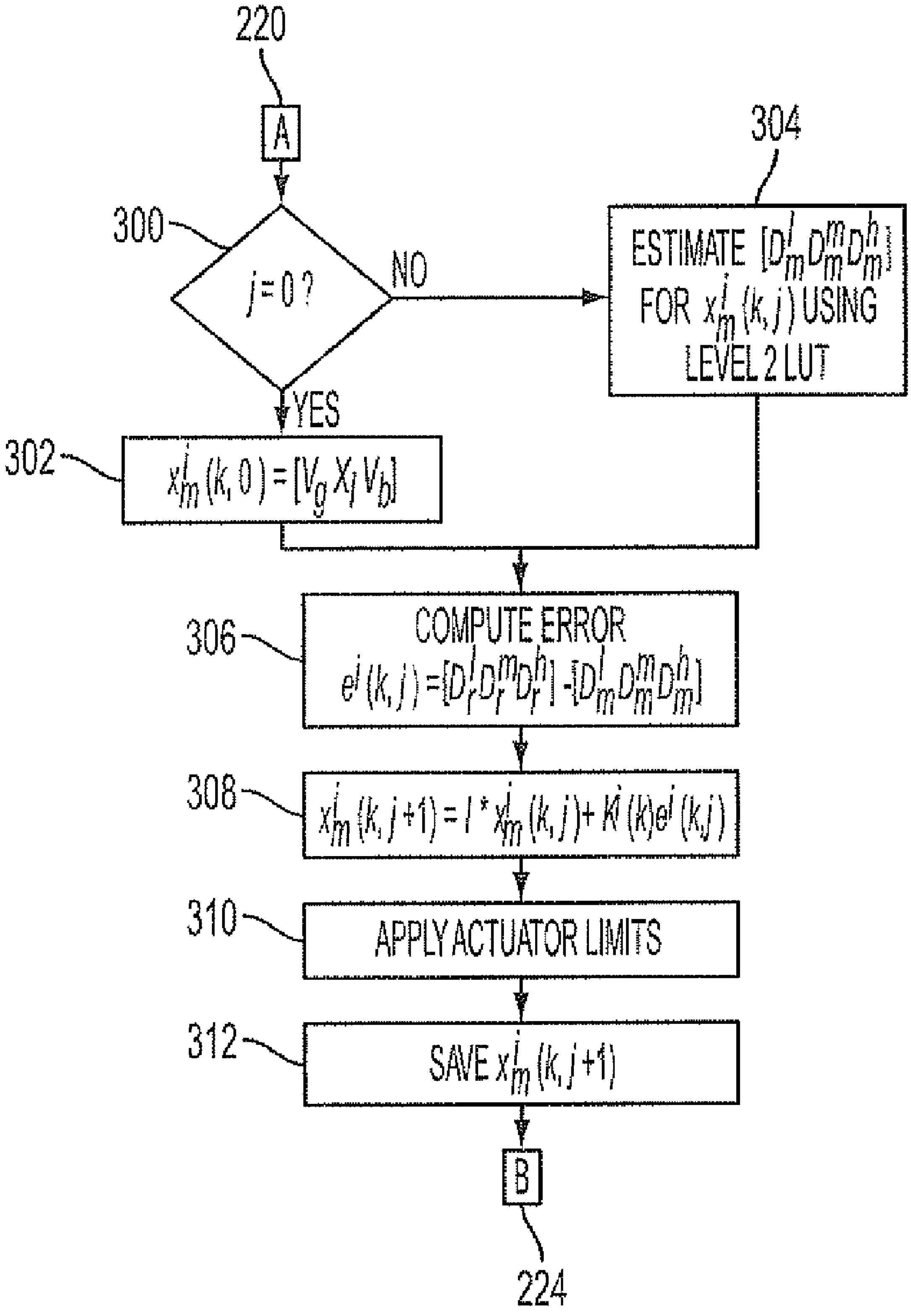
FIG. 3 is a projection flow diagram for each plan (portion of the process control loop, as described hereafter)

As shown in FIG. 3, at step 300, it is determined whether the projection index j is zero or not. If the projection index j is zero, the actuator values $x_m{}^i(k,0)$ are set to the prior control values. If, at step 300, the projection index j is greater than zero, the controlled variables or output variables are estimated based on $x_m{}^i(k,j)$ using the level 2 LUT. After steps 302 and 304, control proceeds to step 306 where the tracking error $e^i(k,j)$ is calculated. At step 308, the estimated actuator values $x_m^i(k,j+1)$ are calculated from the prior estimated actuator values, $x_m^i(k,j)$, and the gain matrix multiplied by the tracking error. At step 310, the actuator limits are applied such as provided in equations (12), and, at step 312, the limited, estimated actuator values $x_m^i(k,j+1)$ are stored. Control then continues as shown in FIG. 2.

At step 226, the partial cost function $J_j$ is calculated. At step 228, the projection index j is incremented and control continues back to step 218 and continues as before.

At step 218, if it is determined that the projection index j is not less than the number of projections N, control continues to step 230, where the cumulative cost function for plan i is computed. At step 232, the plan index i is incremented and control passes back to step 212. Once control has passed to step 216, if it is determined that the plan index i is not less than or equal to the number of plans $N_p$, control passes to step 234. At step 234, the minimum cost function $J^{i*}$ is determined, providing the best plan index number i*. At step 236, the estimated actuator values $x_m^i(k,1)$ are set to the actuator values $x_m^{i*}(k,1)$ of the best plan number i*. At step 238, the routine of FIG. 2 ends.

Figure 4:
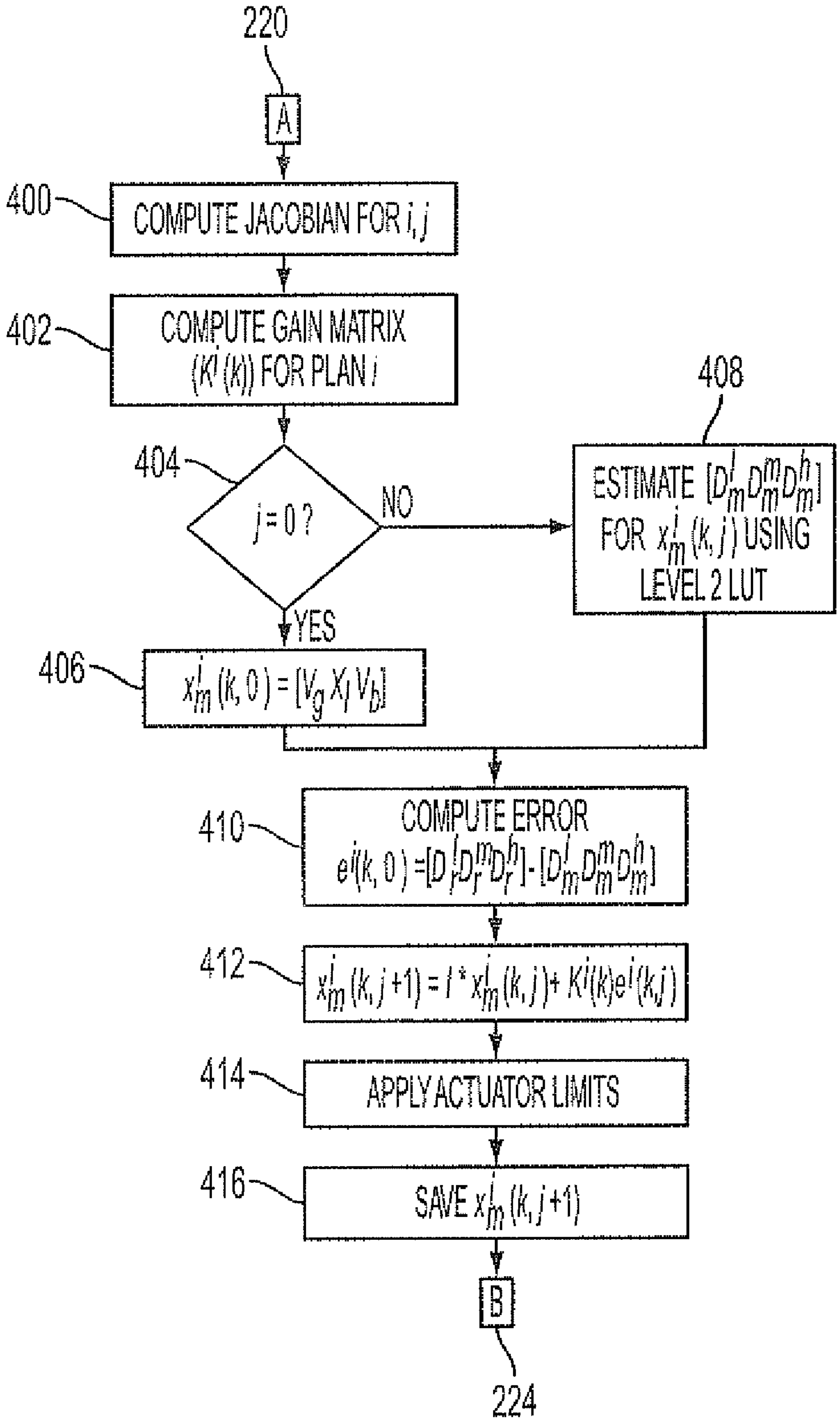
FIG. 4 is another projection flow diagram for each plan.

FIG. 4 shows a variation for the process portion shown in FIG. 3. In this variation, control passes from step 218 of FIG. 2, when the plan iteration index i is less than or equal to the number of plans $N_p$ and the projection index j is less than the number of projections N, at step 400, the system Jacobian matrix is calculated for the plan iteration index i and projection index j pair. At step 402, the gain matrix $K^i(k)$ is calculated based on the system Jacobian matrix and the system pole locations for plan i. Thereafter, steps 404 to 416 are identical to the steps 300 to 318 of FIG. 3, respectively. When this variation is implemented, steps 206 and 212 in FIG. 2 are not needed.

EXAMPLE

Comparison Of MIMO MPC And MIMO State-Feedback By Simulation With A Virtual Printer Model For this comparison example, an application of the disclosed method was simulated using the specific application of an electrostatic printing process for which the controlled variables include the photoreceptor grid voltage ($V_{grid}$), the ROS laser intensity ($X_1$), and the development bias voltage ($V_{bias}$) and the measured output variables or controlled variables are the low DMA tone values ($DMA_{low}$ or $D_l$), the mid DMA tone values ($DMA_{mid}$ or $D_m$), and the high DMA tone values ($DMA_{high}$ or $D_h$).

In these simulations, due to computational time required for MPC, the Jacobian and gain matrices were not separately calculated in each iteration. Instead, the gain matrices for all combinations of poles and Jacobian matrices were calculated at the first iteration (at the nominal actuator input). The best gain matrix from this set was used thereafter depending on the path taken. In other words, the set of precalculated gain matrices correspond to the steady-state gain matrices assuming no drift in the printer.

For this MIMO MPC simulation, 16 combinations of delta values were used for calculation of the Jacobian matrix. The delta for the photoreceptor (PR) grid voltage and the development bias voltage were set to the values of [5, 10, 15, 20] and the delta for the ROS laser intensity was set to the values [0.5, 1, 1.5, 2]. Since it is a 3-input, 3-output MIMO system, there are 3 system poles that could be relocated using state feedback. In this experiment, these 3 system poles are equally spaced between 0.1 and 0.9 at an increment of 0.1. The feasible region for the pole locations is [0, 1) since we are dealing with a discrete system. Pole values close to 1 will result in a slow convergence of the system to the desired targets; and values close to 0 will result in a fast convergence to the targets. The range and increments of the pole locations are decided by the control designer and it are not restricted to the values shown above. The gain matrices for the 16×9 combinations of the Jacobian and poles are determined using MIMO pole placement algorithms well known in modern control literature. Thus, the MPC call choose from 144 gain matrices. The look-ahead projection horizon was set with N=15.

An important aspect of the disclosed subject matter is that the excursion of the actuators is limited as much as possible by using MPC rather than a state-feedback control loop. The weights $w_1=1$ and $w_2=0$ were chosen to emphasize the minimization of the error between the targets and the measurements. FIGS. 2 to 4 show the flowchart used for the implemented MPC algorithm.

FIG. 3 shows the projection step of FIG. 2. In order to keep the system stable, the actuators must be kept within their limits. For instance, ROS laser intensity must be maintained in such a way that its operating point does not go into the saturation region of its proportional-integral-derivative controller (PIDC). But it is easier to set the actuator limits/bounds in terms of the photoreceptor (PR) unexposed charge voltage ($V_h$) and the PR exposed charge voltage ($V_l$) rather than the PR grid voltage ($V_g$) and the ROS laser intensity ($X_l$). This can be seen from FIGS. 1(*a*) and 1(*b*). Setting the bounds on the actuators of FIG. 1(*a*) is easier than for the actuators in FIG. 1(*b*) due to the non-linearity in the feasible actuator values of FIG. 1(*b*). This is because the actuators of FIG. 1(*a*) to the measurements of FIG. 1(*c*) correspond to all open loop system for a Level 2 controller. In any open loop system, there are inputs and outputs. The inputs have upper and lower limits. To know the operating space for the open loop system, we can vary the inputs in a structured way (e.g., uniformly sampled as in FIG. 1(*a*)) within their known limits. The limits on actuators are known a priori from the system design. Limits on actual outputs depend on the environment, uncertainties, and factors associated with the system design. In other words, the limits on actual outputs are not exactly known during system design. A LUT between $[V_h V_l V_b]$ and $[V_g X_l V_b]$ is the level 1 LUT. The process of applying actuator limits includes the following steps:

1. Find the actuators $[V_h V_l V_b]$ from $[V_g X_l V_b]$ using a level 1 LUT.
2. Apply the following bounds:

$$V_{hmin} \leqq V_h \leqq V_{hmax}$$

$$V_{lmin} \leqq V_l \leqq V_{lmax}$$

$$V_{bmin} \leqq V_b \leqq V_{bmax} \quad (12)$$

3. Convert the bounded actuators $[V_h V_l V_b]$ to $[V_g X_l V_b]$ using the level 1 LUT again.

Simulation Results

Figure 5:
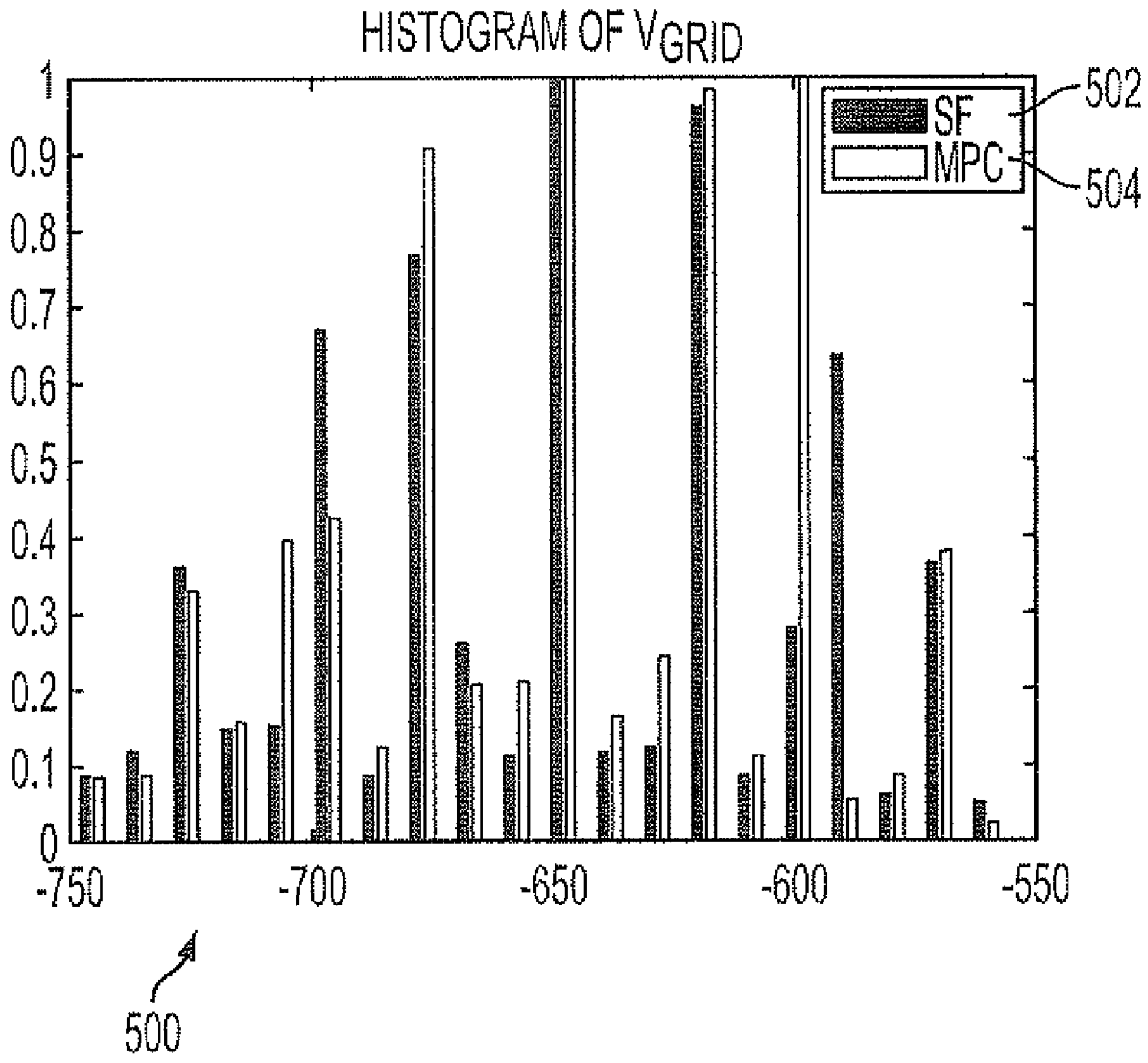
FIG. 5 is a histogram of PR grid voltages in a comparison of S-F (state feedback with single gain matrix) and MPC (model predictive control with gain scheduling and planning) level 2 systems.
Figure 6:
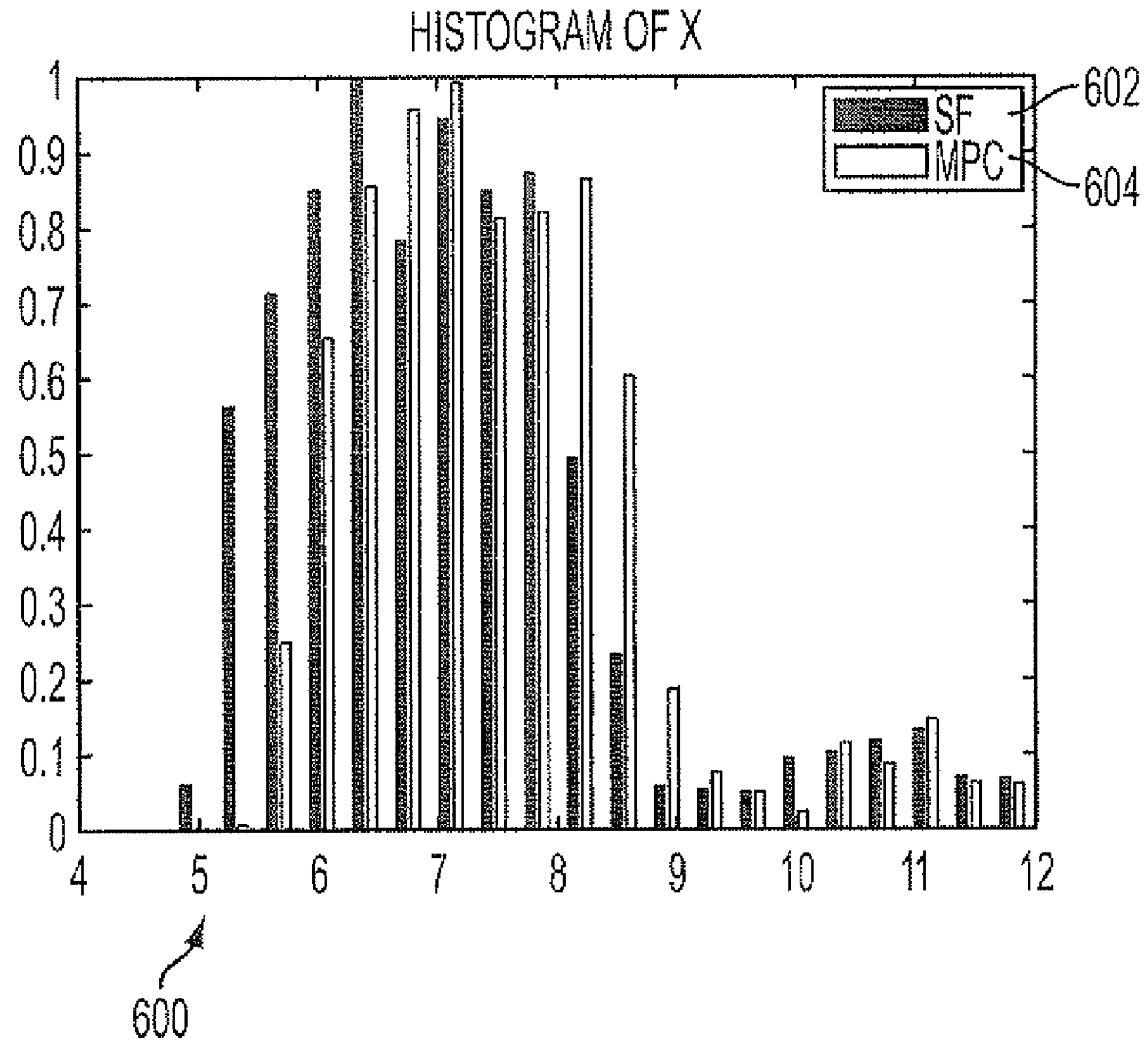
FIG. 6 is a histogram of ROS laser intensity in a comparison of S-F and MPC level 2 systems.
Figure 7:
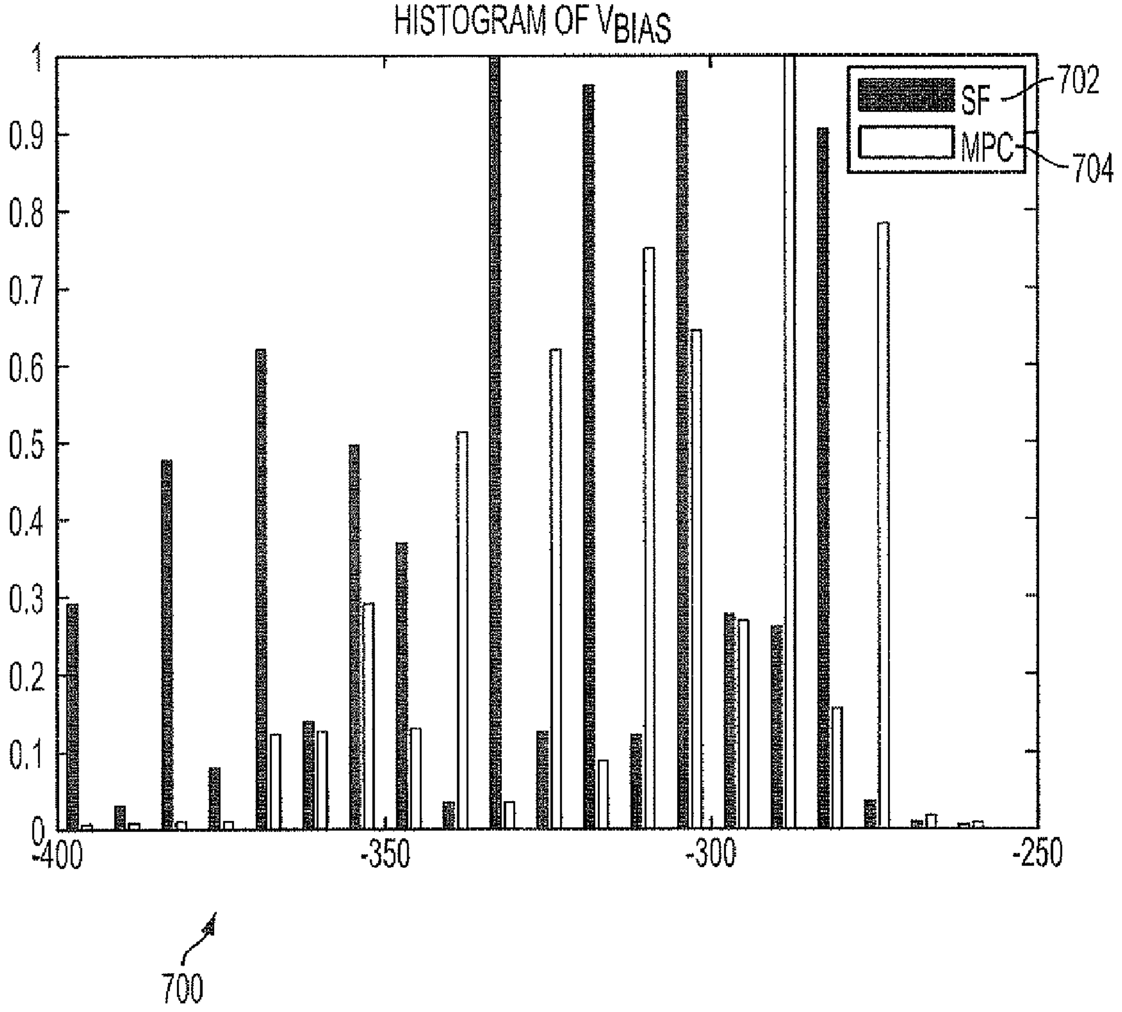
FIG. 7 is a histogram of development bias voltage in a comparison of S-F and MPC level 2 systems.

FIG. 5 shows a histogram 500 of the excursion of the actuators during the transient state of the control loop according to MPC (504) and state feedback (S-F) (502). More specifically, the histogram 500 shows a comparison of the photoreceptor grid voltages ($V_{grid}$) for all the actuators (x) in a MPC level 2 system and a S-F level 2 system during the transient state for 355 DMA setpoints. FIG. 6 shows a histogram 600 showing a comparison of the ROS laser intensity values used by the methods in the MPC level 2 system (604) and the S-F level 2 system (602). FIG. 7 shows a histogram 700 showing a comparison of development bias voltages used by the methods in the MPC level 2 system (704) and the S-F level 2 system (702).

It can be seen that there is no large improvement in the grid voltage excursion, but there is significant improvement in laser intensity and bias voltages. There is another important observation to be made. These actuators are used in combination with each other and not individually. So improvement in laser intensity and bias voltage excursion, i.e. less excursion using MPC, leads to less excursion in the overall actuator combinations.

Figure 8:
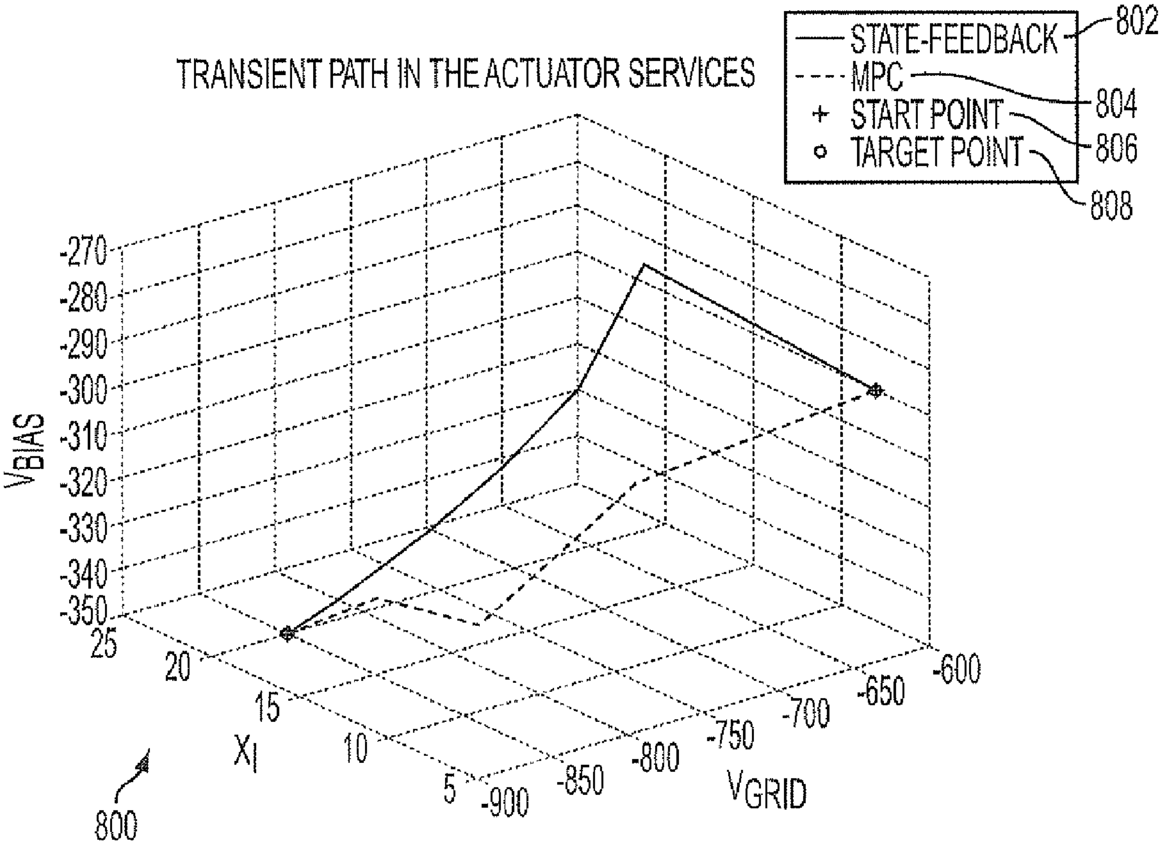
FIG. 8 is a graph showing transient actuator states in a comparison of state-feedback and MPC process control.
Figure 9A:
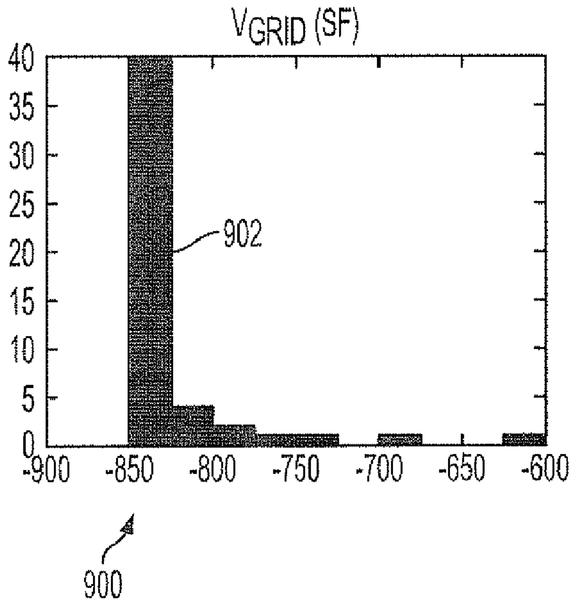
FIGS. 9A and 9B show two histograms of grid voltages for a single DMA setpoint in a comparison of state-feedback (FIG. 9A) and MPC process control (FIG. 9B)
Figure 9B:
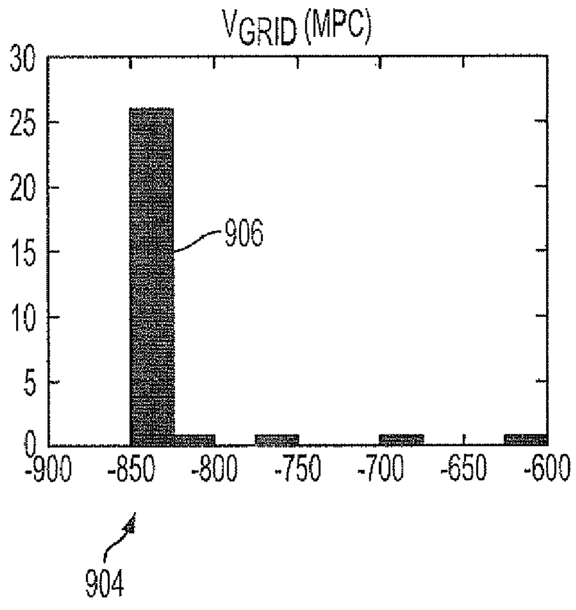
Figure 10A:
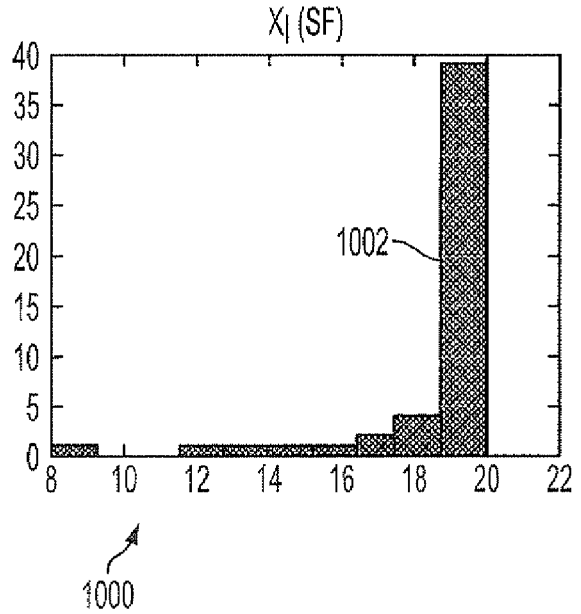
FIGS. 10A and 10B show two histograms of laser intensity for a single DMA setpoint in a comparison of state-feedback (FIG. 10A) and MPC process control (FIG. 10B)
Figure 10B:
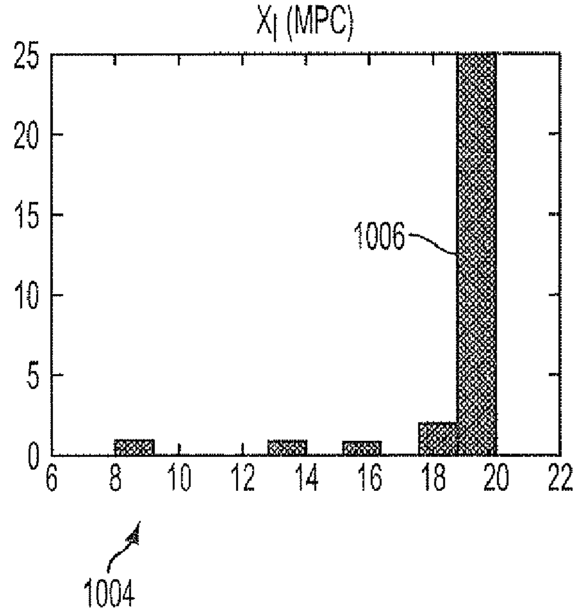
Figure 11A:
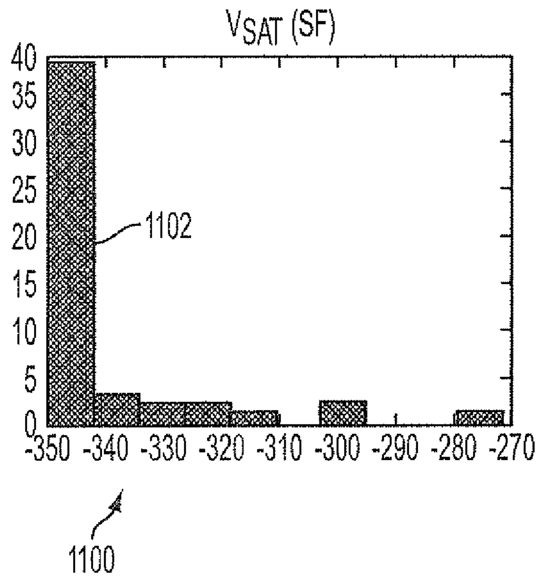
FIGS. 11A and 11B show two histograms of bias voltage for a single DMA setpoint in a comparison of state-feedback (FIG. 11A) and MPC process control (FIG. 10B)
Figure 11B:
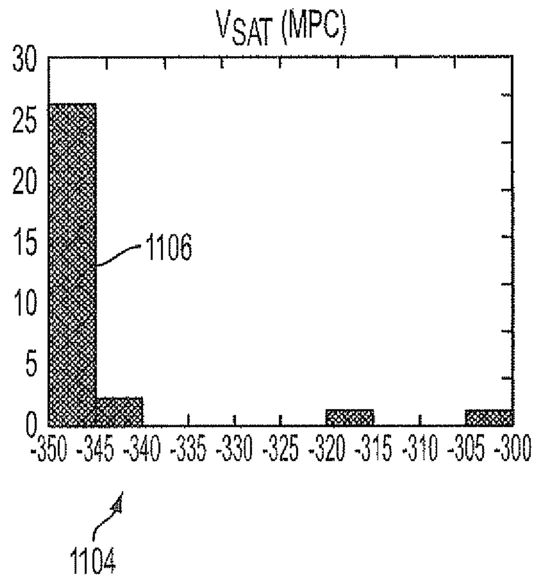
Figure 12:
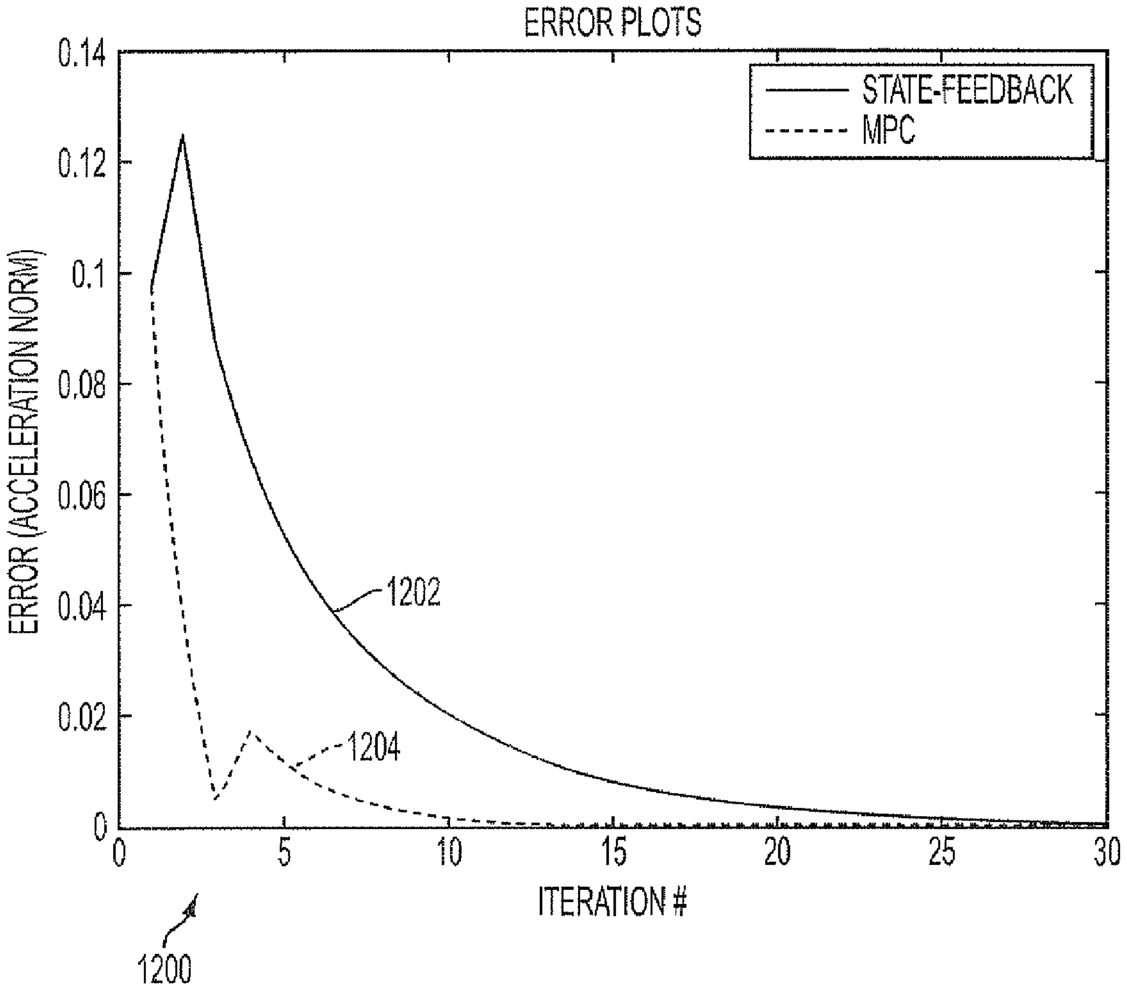
FIG. 12 shows error plots for a single DMA setpoint in a comparison of state feedback and MPC process control.

FIG. 8 is a graph 800 showing the 3-D excursions 802 of actuators for a DMA target setpoint of [0.0789, 0.2546, 0.4525] in FIG. 7. It can be seen from FIG. 8 that MPC takes a more direct path toward the final actuator values required for generating the DMA targets than state-feedback. FIGS. 9A, 10A and 11A show histograms 900, 1000 and 1100 showing the values 902, 1002 and 1102, respectively, of the three actuators for the setpoint shown in FIG. 8 using state feedback. FIGS. 9B, 10B and 11B further show histograms 904, 1004 and 1104 showing the values 906, 1006 and 1106, respectively, of the three actuators for the setpoint shown in FIG. 8 using MPC. There is less excursion of actuators due to gain scheduling using MPC than due to state-feedback. FIG. 12 is a graph 1200 showing error plots for the MPC (1204) and state-feedback (1202) control loops for the setpoint shown in FIG. 8.

In summary, the dynamic range of actuators is large with single gain matrix solution. The disclosed multiple gain matrix solution corrects this shortcoming. The multiple gain matrix solution is a systematic way to automatically switch between gain matrices during the closed loop control actions (i.e., measurement-processing-actuation cycle). Switching between gain matrices happens inside the model predictive controller. The controller uses the input-output characterization data of the system obtained apriori. This can help to solve many undesirable stability problems, actuator overshoots etc, particularly when the nonlinear print engines are operating near their full capacity.

Using the described methodology, since scheduling of gain matrices is automatic, when setpoints change (for example, when the media changes, or when DMA targets change due to actions from a higher level loop), the closed loop system can still perform with improved robustness without instability. This was demonstrated via simulations using the gain scheduling approach as compared to without the gain scheduling approach. The methodology does not call for hardware changes. Thus, the disclosed algorithms can be implemented in existing hardware with additional configuration provided by programming.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A method to schedule gains in a process control loop for a process to optimize image quality in an electrostatic printing system, the method comprising: reading values for controlled variables of the process from one or more sensors in the electrostatic printing system; determining values to be applied to the process for each of manipulated variables of the process, each value for the manipulated variables being determined based on the values for the controlled variables and by using at least two different gain matrices; and applying the determined values to optimize the image quality in an image produced on an image recording medium output from the electrostatic printing system, wherein the controlled variables are developed mass per unit areas (DMAs) of content portions on the recording medium.

2. The method of claim 1, wherein the values for the manipulated variables are determined for the process at discrete time intervals.

3. The method of claim 1, wherein the controlled variables are the developed mass per unit area (DMA) for each of low, medium, and high tone content portions on the recording medium.

4. The method of claim 1, wherein the values for the manipulated variables include photoreceptor grid voltage, laser intensity, and development bias voltage.

5. The method of claim 1, wherein each gain matrix is calculated from a Jacobian matrix and pole locations for the electrostatic printing system.

6. A process control system that schedules gains for a process control loop to optimize image quality in an electrostatic printing system, comprising: a sensing system that reads values for controlled variables of a process operating in the electrostatic printing system from one or more sensors; and a controller that determines values to be applied to the process for each of manipulated variables of the process, each value for the manipulated variables being determined based on the values for the controlled variables and by using at least two different gain matrices, and applies the determined values to optimize the image quality in an image produced on an image recording medium output from the electrostatic printing system, wherein the controlled variables are developed mass per unit areas (DMAs) of content portions on the recording medium.

7. The process control system of claim 6, wherein the values for the manipulated variables are determined for the process at discrete time intervals.

8. The process control system of claim 6, wherein the controlled variables are the developed mass per unit area (DMA) for each of low, medium, and high tone content portions on the recording medium.

9. The process control system of claim 6, wherein the values for the manipulated variables include photoreceptor grid voltage, laser intensity, and development bias voltage.

* * * * *